US012403609B2

(12) United States Patent
Oh et al.

(10) Patent No.: US 12,403,609 B2
(45) Date of Patent: Sep. 2, 2025

(54) ELECTRONIC DEVICE AND CONTROL METHOD THEREFOR

(71) Applicant: Samsung Electronics Co., Ltd., Suwon-si (KR)

(72) Inventors: Jaeyul Oh, Suwon-si (KR); Sukjune Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 138 days.

(21) Appl. No.: 18/506,268

(22) Filed: Nov. 10, 2023

(65) Prior Publication Data
US 2024/0075630 A1 Mar. 7, 2024

Related U.S. Application Data

(63) Continuation of application No. PCT/KR2022/004907, filed on Apr. 6, 2022.

(30) Foreign Application Priority Data

May 10, 2021 (KR) .......................... 10-2021-0060157

(51) Int. Cl.
  *B25J 9/16* (2006.01)
  *G05B 19/4061* (2006.01)
  (Continued)

(52) U.S. Cl.
  CPC ........... *B25J 9/1697* (2013.01); *B25J 9/1664* (2013.01); *G06T 7/13* (2017.01); *G06T 7/74* (2017.01);
  (Continued)

(58) Field of Classification Search
  CPC . B25J 9/1697; B25J 9/1664; B25J 9/16; B25J 19/02; B25J 9/1684; B25J 19/023;
  (Continued)

(56) References Cited

U.S. PATENT DOCUMENTS 4,146,924 A * 3/1979 Birk ....................... B25J 9/1692
  318/568.14
7,269,479 B2 * 9/2007 Okamoto ............... B25J 9/0003
  901/2

(Continued)

FOREIGN PATENT DOCUMENTS

JP  2000084876 A  3/2000
JP  WO2011036865 A1  2/2013

(Continued)

OTHER PUBLICATIONS

International Search Report for PCT/KR2022/004907 mailed Jul. 8, 2022, 4 pages.

(Continued)

*Primary Examiner* — Jaime Figueroa
(74) *Attorney, Agent, or Firm* — Nixon & Vanderhye, P.C.

(57) ABSTRACT

According to an embodiment, an electronic device comprises: a moving member comprising a motor, an operation performance member including an arm, a communication module comprising communication circuitry, a camera and at least one processor operatively connected to the moving member, the operation performance member, the communication module and the camera, wherein one or more of the at least one processor is configured to: control the moving member so that the electronic device moves to a position related to operation performance confirmed based on an operation performance command based on the operation performance command being received through the communication module, acquire a first marker image through the camera based on moving to the position, set a reference coordinate system based on the first marker image, set an operation area boundary within the reference coordinate system based on operation area boundary information acquired through a second marker image based on the (Continued)

second marker image being acquired through the camera, and control at least one of the operation performance members so that the same operates within the operation area boundary.

20 Claims, 11 Drawing Sheets

(51) Int. Cl.
  *G06T 7/13* (2017.01)
  *G06T 7/73* (2017.01)
  *H04N 7/18* (2006.01)
(52) U.S. Cl.
  CPC ... *H04N 7/183* (2013.01); *G06T 2207/30204* (2013.01)
(58) Field of Classification Search
  CPC ... G06T 7/13; G06T 7/74; G06T 2207/30204; G06T 19/00; G06T 19/006; H04N 7/183; G05B 2219/40298; G05B 19/4061; G05B 2219/37183; G06K 19/06; G06K 19/06009
  USPC .............. 700/245–264; 318/568.11–568.25
  See application file for complete search history.

(56) References Cited

U.S. PATENT DOCUMENTS

| | | | |
|---|---|---|---|
| 7,515,990 B2* | 4/2009 | Sato | B25J 5/007 700/262 |
| 9,599,462 B2* | 3/2017 | Kobayashi | G01B 11/2513 |
| 10,019,639 B2* | 7/2018 | Vandeweerd | G06T 1/0021 |
| 10,415,966 B2* | 9/2019 | Sato | G05D 1/0234 |
| 10,434,655 B2* | 10/2019 | Suzuki | B25J 9/1692 |
| 11,067,997 B2* | 7/2021 | Xiong | G06T 7/74 |
| 11,328,842 B2* | 5/2022 | Blacken | H01B 13/01209 |
| 11,396,100 B2* | 7/2022 | Krause | G06F 3/0346 |
| 11,633,245 B2* | 4/2023 | Kasai | A61B 90/361 700/259 |
| 11,696,814 B2* | 7/2023 | Nagao | A61B 90/361 600/102 |
| 11,969,904 B2* | 4/2024 | Chen | B25J 9/1653 |
| 11,995,865 B2* | 5/2024 | Hasegawa | G01C 21/206 |
| 12,134,166 B1* | 11/2024 | Ahire | B24B 49/16 |
| 2003/0164200 A1* | 9/2003 | Czeranna | B62D 65/18 141/1 |
| 2006/0047361 A1* | 3/2006 | Sato | G05D 1/028 700/245 |
| 2006/0293810 A1* | 12/2006 | Nakamoto | G05D 1/0274 701/28 |
| 2007/0124024 A1* | 5/2007 | Okamoto | B25J 9/0003 700/245 |
| 2011/0118872 A1 | 5/2011 | Ortmaier et al. | |
| 2011/0208355 A1 | 8/2011 | Tsusaka | |
| 2014/0257329 A1 | 9/2014 | Jang et al. | |
| 2015/0146215 A1* | 5/2015 | Kobayashi | G01B 11/2504 356/610 |
| 2015/0266183 A1 | 9/2015 | Alifragkis et al. | |
| 2015/0290795 A1* | 10/2015 | Oleynik | B25J 9/0081 700/257 |
| 2016/0059419 A1* | 3/2016 | Suzuki | B25J 9/1692 901/14 |
| 2016/0214258 A1 | 7/2016 | Yan | |
| 2017/0032529 A1* | 2/2017 | De Villiers | B25J 9/1697 |
| 2018/0186004 A1 | 7/2018 | Park et al. | |
| 2019/0365499 A1* | 12/2019 | Nagao | B25J 13/00 |
| 2019/0389066 A1 | 12/2019 | Jung et al. | |
| 2020/0046169 A1 | 2/2020 | Ju et al. | |
| 2020/0078948 A1* | 3/2020 | Krause | G06F 3/0346 |
| 2021/0026335 A1 | 1/2021 | Isozumi et al. | |
| 2021/0125750 A1* | 4/2021 | Blacken | H01B 13/01245 |
| 2021/0170603 A1* | 6/2021 | Kotlarski | B25J 13/006 |
| 2021/0312660 A1* | 10/2021 | Hasegawa | G01C 21/165 |
| 2022/0314437 A1* | 10/2022 | Gienger | B25J 9/1671 |
| 2023/0089195 A1* | 3/2023 | Satoh | B25J 13/089 700/258 |

FOREIGN PATENT DOCUMENTS

| | | |
|---|---|---|
| JP | 2017071033 A | 4/2017 |
| JP | WO2016056087 A1 | 8/2017 |
| JP | 6644104 B2 | 1/2020 |
| KR | 20040003089 A | 1/2004 |
| KR | 20040080583 A | 9/2004 |
| KR | 20050110466 A | 11/2005 |
| KR | 20140110685 A | 9/2014 |
| KR | 20150070370 A | 6/2015 |
| KR | 20160091278 A | 8/2016 |
| KR | 20160105963 A | 9/2016 |
| KR | 20170030690 A | 3/2017 |
| KR | 20180080630 A | 7/2018 |
| KR | 20180109118 A | 10/2018 |
| KR | 101964332 B1 | 7/2019 |
| KR | 20190112679 A | 10/2019 |
| KR | 20200057321 A | 5/2020 |
| KR | 20210014033 A | 2/2021 |

OTHER PUBLICATIONS

Written Opinion of the ISA for PCT/KR2022/004907 mailed Jul. 8, 2022, 3 pages.

* cited by examiner ated arm, a communication module comprising communication circuitry, a camera, and at least one processor operatively connected to the moving member, the task performing member, the communication module, and the camera. One or more of the at least one processor may be configured to: upon receiving a task performance command through the communication module, control the moving member to move to a task performing-related position identified based on the task performance command, obtain a first marker image through the camera based on moving to the position, set a reference coordinate system based on the first marker image, upon obtaining a second marker image through the camera, set a task area boundary in the reference coordinate system based on task area boundary information obtained through the second marker image, and control at least one task performing member to operate within the task area boundary.

According to various example embodiments, a method for controlling an electronic device may comprise, upon receiving a task performance command moving to a task performing-related position identified based on the task performance command, obtaining a first marker image through a camera based on moving to the position, setting a reference coordinate system based on the first marker image, upon obtaining a second marker image through the camera, setting a task area boundary in the reference coordinate system based on task area boundary information obtained through the second marker image, and controlling the electronic device to operate within the task area boundary.

According to various example embodiments, a display device may comprise: a camera, a display, and at least one processor operatively connected to the camera and the display. One or more of the at least one processor may be configured to: display, on the display, an image for a task space including a first marker image through the camera, receive a drawing input related to a task area boundary in the task space displayed on the display, display, in augmented reality, the drawing input in the task space displayed on the display, generate task area boundary information based on the drawing input on a reference coordinate system set based on the first marker image, and generate a second marker image including the task area boundary information.

An electronic device according to various example embodiments of the disclosure may set a task area boundary that is not affected by an error that occurs upon docking in a task space.

Further, since it is not required to store information about a plurality of task places in the electronic device, the system design may be easier.

Further, upon designing a task place, the user may preset a task area boundary.

It is also possible to intuitively provide the user with a task boundary area through augmented reality technology.

BRIEF DESCRIPTION OF THE DRAWINGS

The above and other aspects, features and advantages of certain embodiments of the present disclosure will be more apparent from the following detailed description, taken in conjunction with the accompanying drawings, in which.

ELECTRONIC DEVICE AND CONTROL METHOD THEREFOR

CROSS-REFERENCE TO RELATED APPLICATIONS

This application is a continuation of International Application No. PCT/KR2022/004907 designating the United States, filed on Apr. 6, 2022, in the Korean Intellectual Property Receiving Office and claiming priority to Korean Patent Application No. 10-2021-0060157, filed on May 10, 2021, in the Korean Intellectual Property Office, the disclosures of each of which are incorporated by reference herein in their entireties.

BACKGROUND

Field

The disclosure relates to an electronic device for setting a task area boundary and a control method thereof.

DESCRIPTION OF RELATED ART

In the conventional industry, robot arms are typically fixed in a safe fence while being used, and the worker, facilities, and materials are protected from sudden movements of the robot arm due to the worker's mistakes or program errors in the fence by restricting the movable range of the robot arm or task area by program settings.

For example, the task area of the robot arm is set based on the coordinate system (e.g., tool center position (TCP)) of the robot.

Meanwhile, mobile robots have the advantage of being able to work in various spaces by combining a robot arm on top of a movable robot.

Unlike the fixed robot arm, however, difficulty exists in restricting the task area of the robot arm for safety purposes as the shape or size of the task space, size, content of task, or task reference coordinate system information vary whenever it moves.

The arm of the mobile robot (or electronic device) should process the task fitting the task space while moving various task spaces.

When processing a task, the arm of the mobile robot docks the robot in a predetermined place and performs the assigned task. Upon docking, a tiny error occurs in the robot docking position, causing a failure in achieving the task with respect to the robot coordinate system.

Due to such issue, after docking in the task space, the mobile robot arm uses a separate reference coordinate system for the task assigned by recognition of the markers attached in the task place, such as a jig or facility through a camera attached to the robot arm.

However, since it obtains the reference coordinate system through the attached markers in every task space to perform the task, it may not use robot task area restriction information based on the robot coordinate system.

SUMMARY

Embodiments of the disclosure provide an electronic device and a control method that sets a robot task area boundary upon robot working in various spaces.

Figure 3:
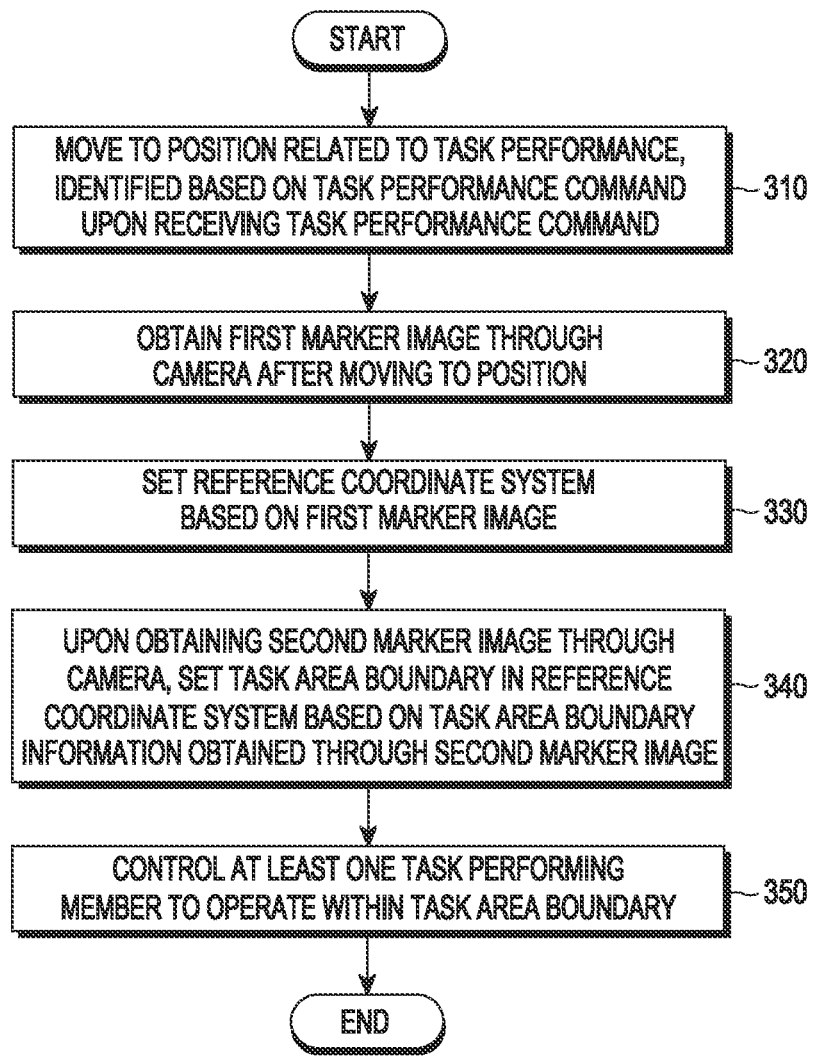
Figure 4:
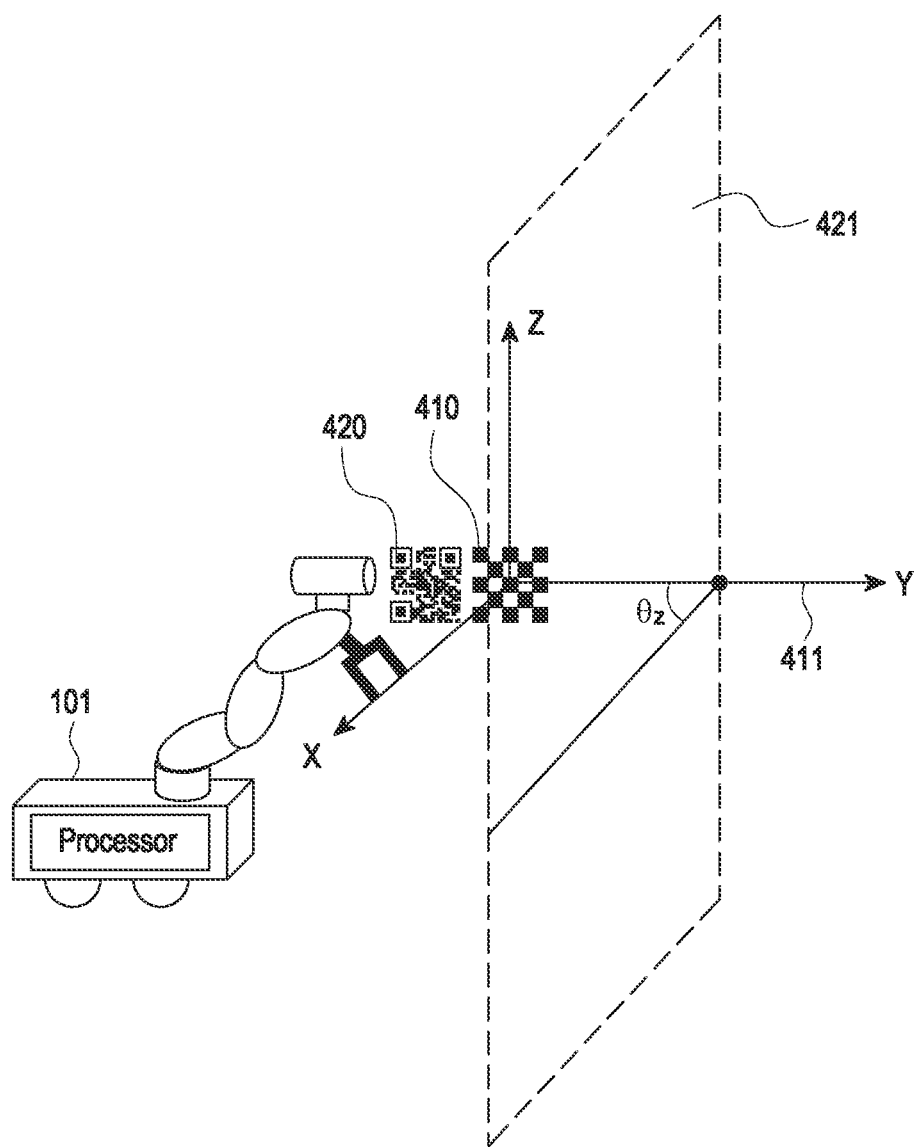
Figure 5A:
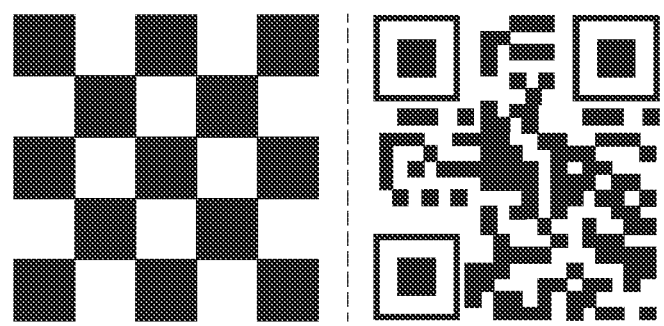
Figure 5B:
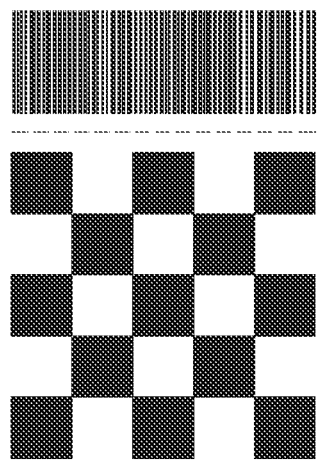
Figure 5C:
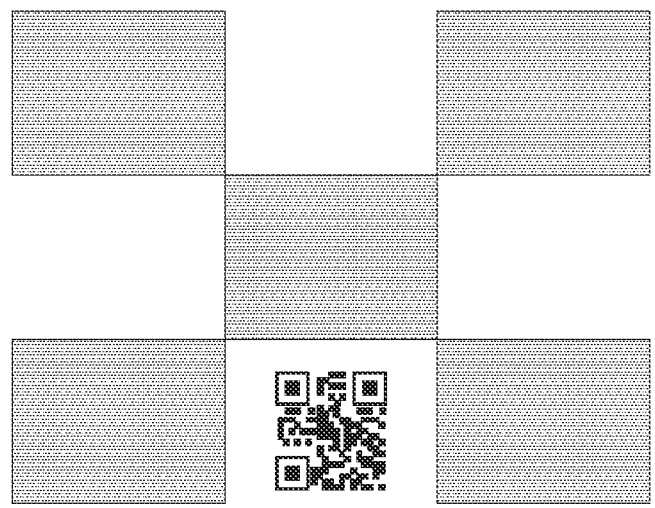
Figure 5D:
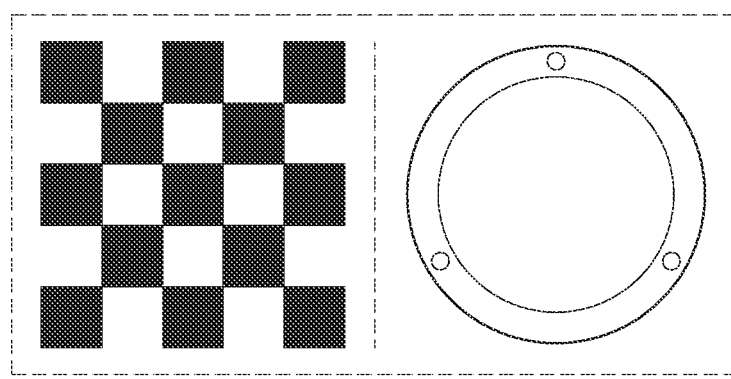
Figure 6:
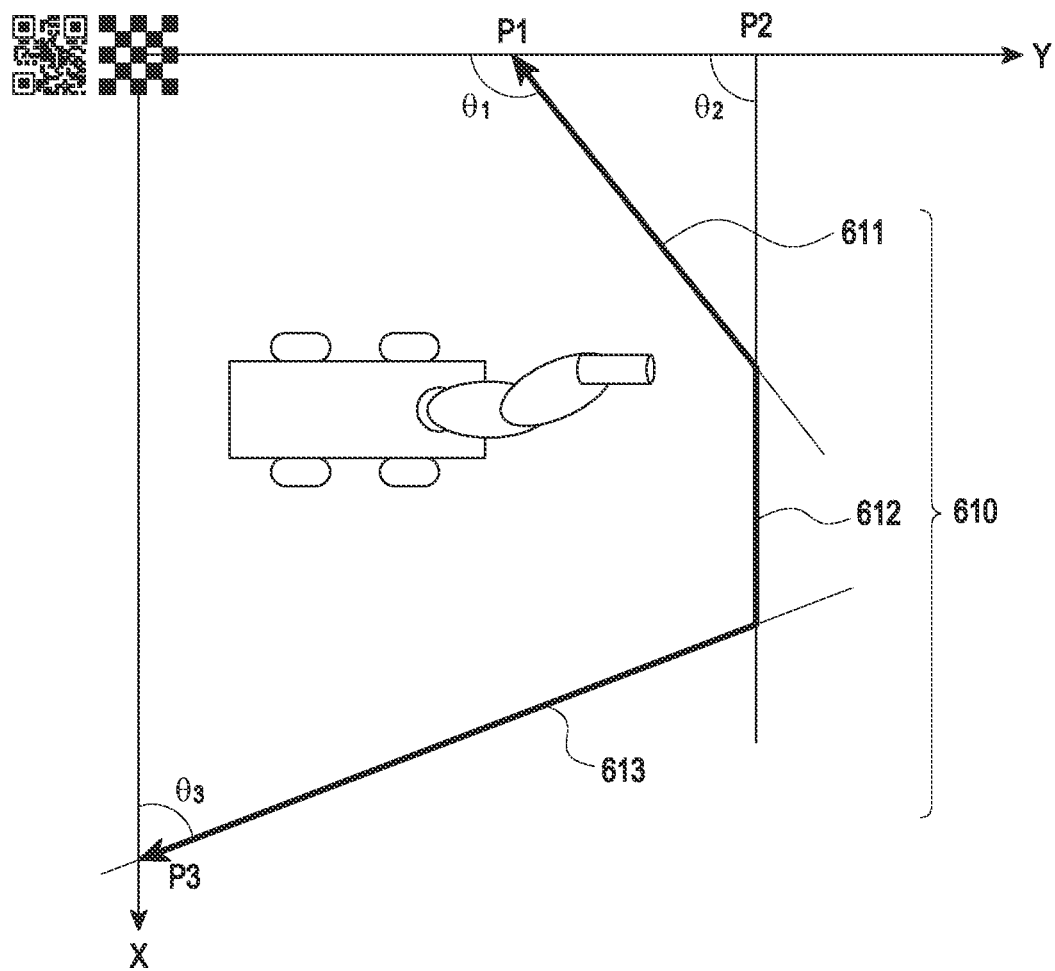
Figure 7:
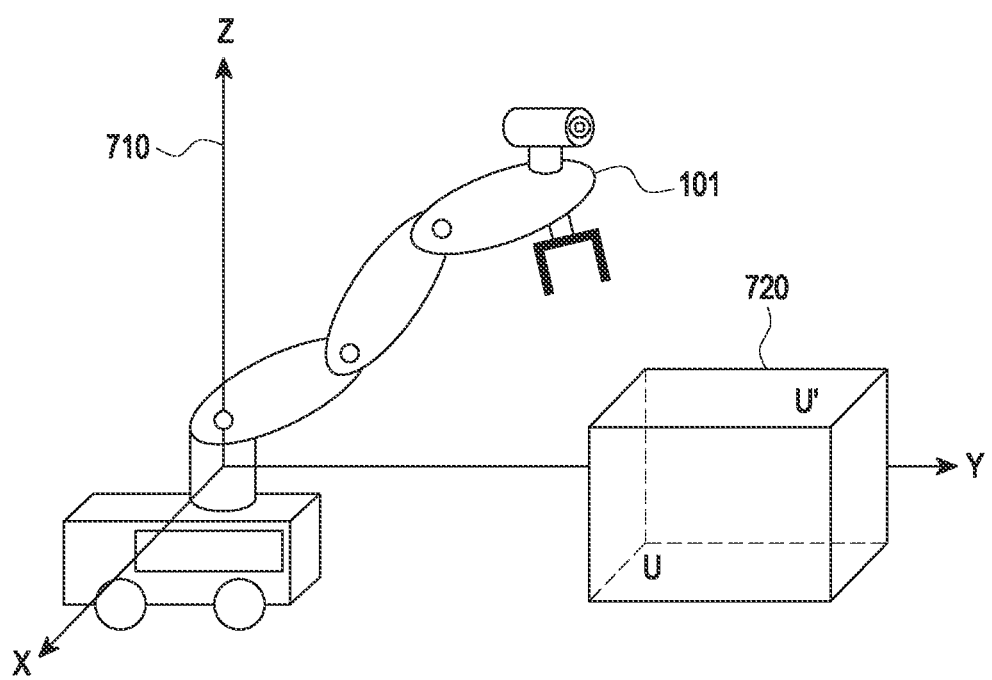
Figure 8:
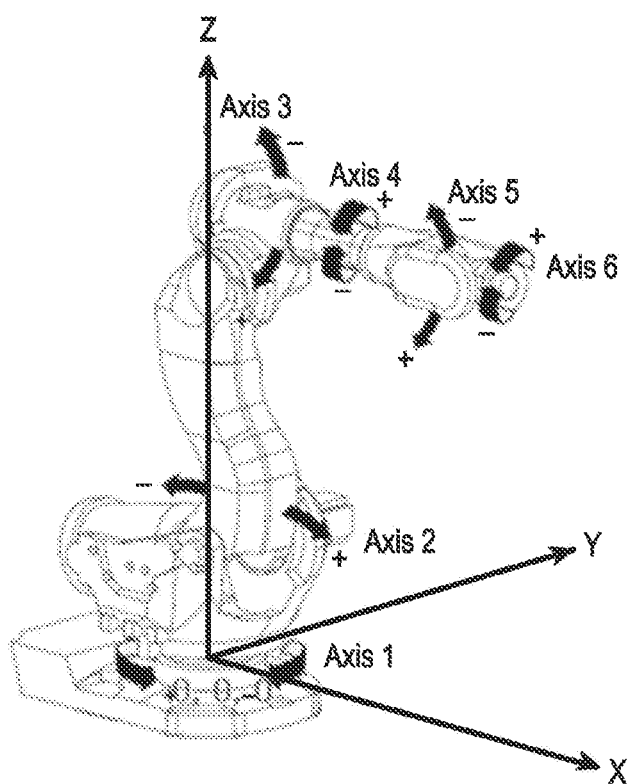
Figure 9:
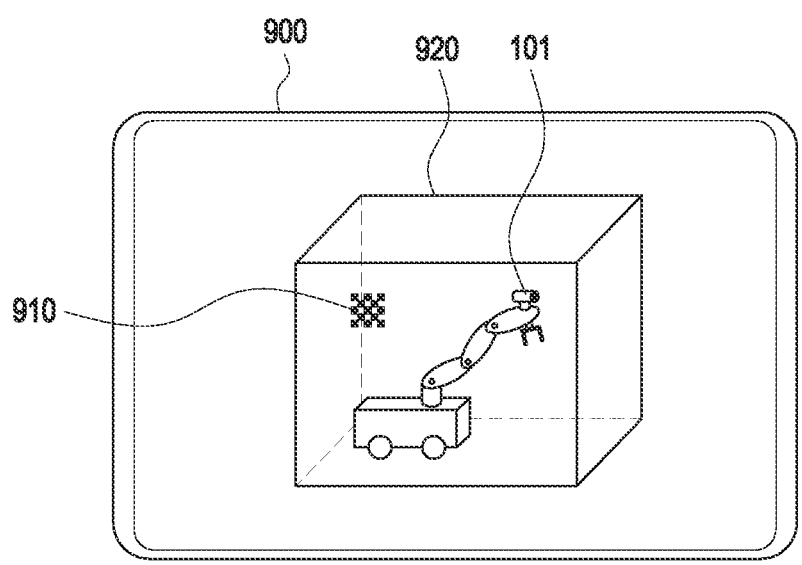
Figure 10:
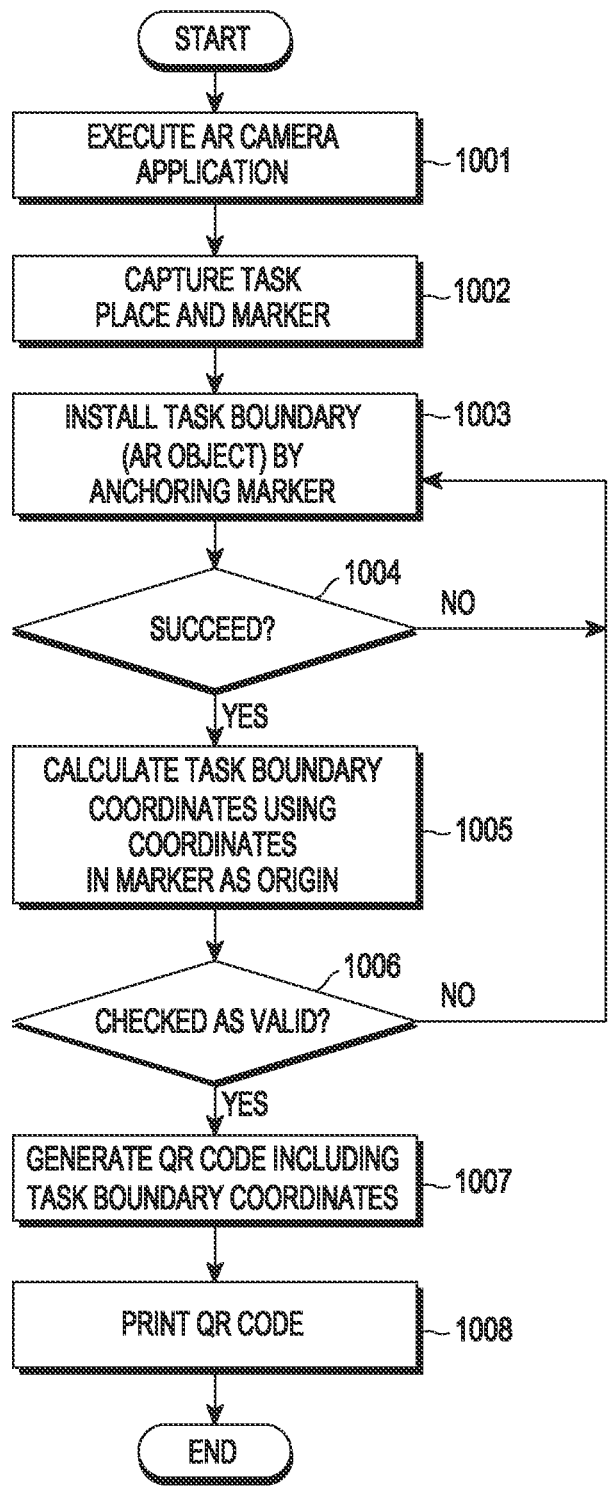

According to various example embodiments, an electronic device may comprise: a moving member comprising a motor, a task performing member comprising an articu- FIG. 3 is a flowchart illustrating an example operation of setting a task area boundary by an electronic device according to various embodiments;

FIG. 4 is a diagram illustrating an example operation of setting a task area boundary surface by an electronic device according to various embodiments;

FIG. 5A is a diagram illustrating an example first marker image and an example second marker image according to various embodiments;

FIG. 5B is a diagram illustrating an example first marker image and an example second marker image according to various embodiments;

FIG. 5C is a diagram illustrating an example first marker image and an example second marker image according to various embodiments;

FIG. 5D is a diagram illustrating an example beacon device for task area boundary information and an example first marker image according to various embodiments;

FIG. 6 is a diagram illustrating a polygonal task area boundary of an electronic device according to various embodiments;

FIG. 7 is a diagram illustrating a hexagonal task area boundary of an electronic device according to various embodiments;

FIG. 8 is a diagram illustrating a movable area for each axis of an electronic device according to various embodiments;

FIG. 9 is a diagram illustrating an example operation of displaying a task area boundary in augmented reality according to various embodiments; and FIG. 10 is a flowchart illustrating an example operation of generating a marker image including task area boundary information using augmented reality according to various embodiments.

DETAILED DESCRIPTION

Figure 1:
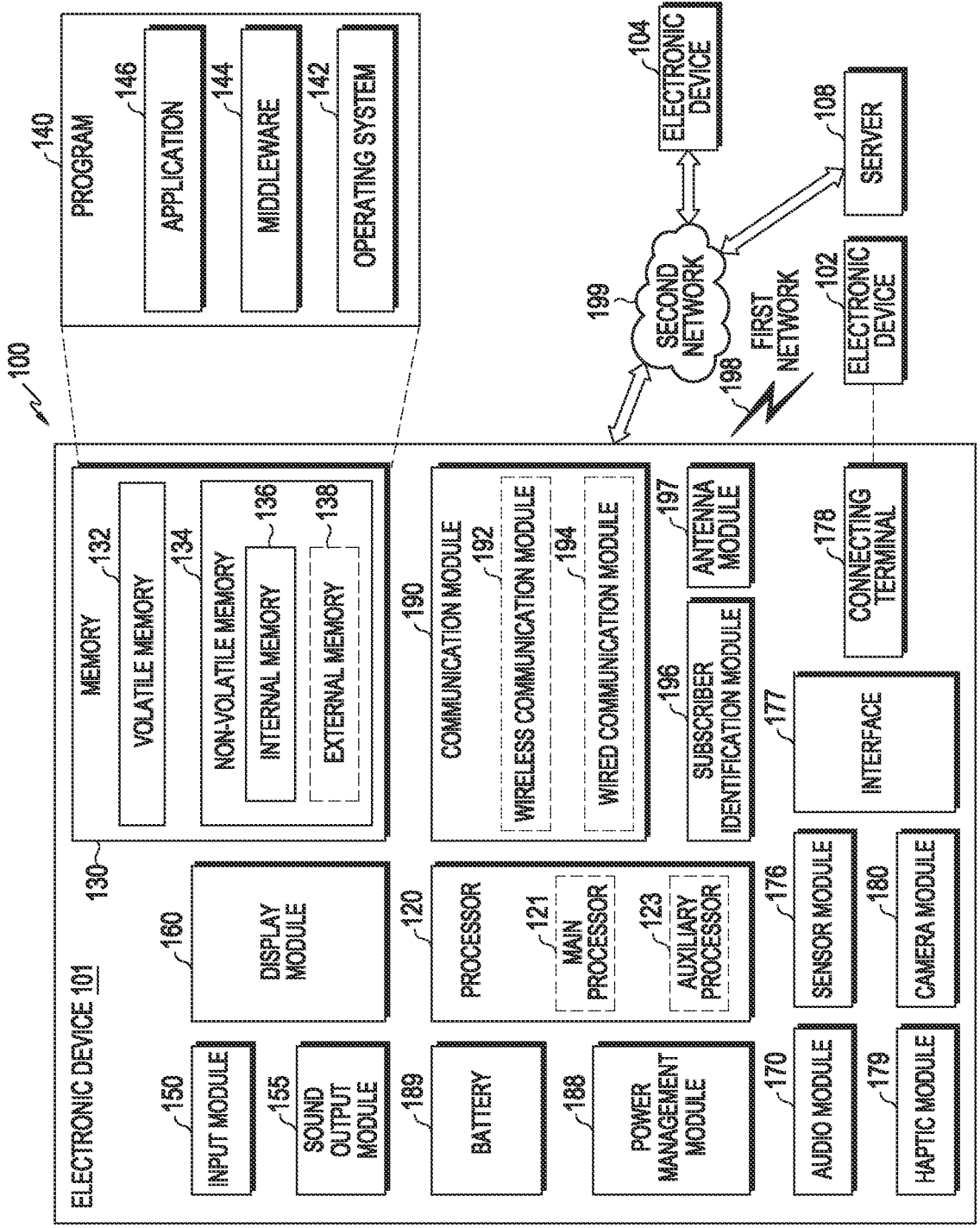
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal According to an embodiment, the display module 160 may include a first display module 351 corresponding to the user's left eye and/or a second display module 353 corresponding to the user's right eye, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include an antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
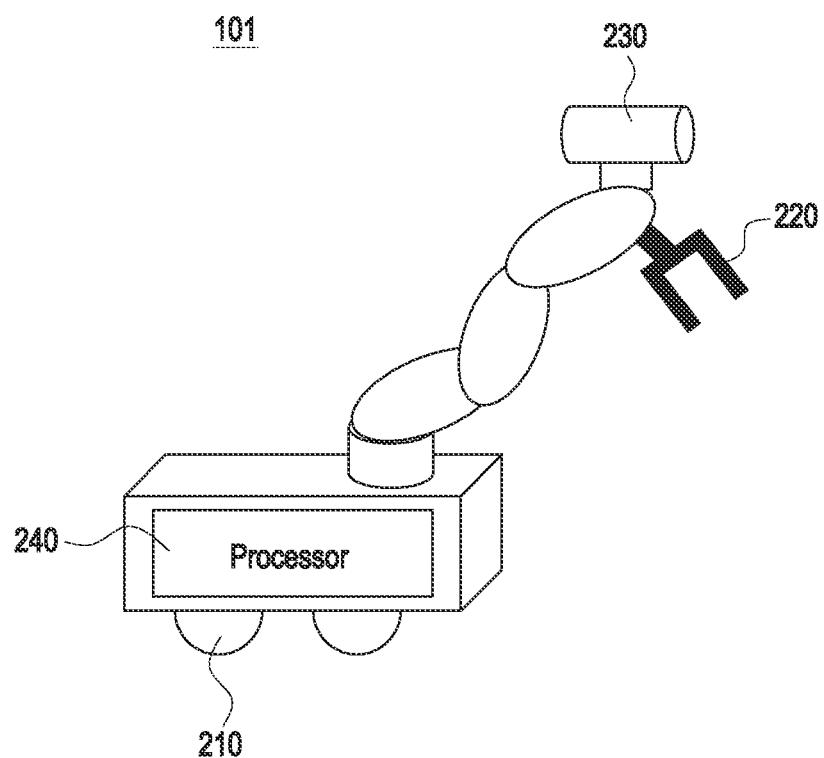
FIG. 2 is a diagram illustrating an example configuration of a mobile robot-type electronic device according to various embodiments.

FIG. 2 is a diagram illustrating an example configuration of a mobile robot-type electronic device according to various embodiments.

According to various embodiments, referring to FIG. 2, an electronic device 101 (e.g., the electronic device 101 of FIG. 1) includes a moving member (e.g., including a motor) 210, a task performing member (e.g., including an arm) 220, a camera 230 (e.g., the camera module 180 of FIG. 1), and a processor (e.g., including processing circuitry) 240 (e.g., the processor 120 of FIG. 1).

According to various embodiments, the electronic device 101 may perform a task suitable for the corresponding task space while moving the task space. For example, the electronic device 101 may include a mobile robot.

According to various embodiments, the moving member 210 may move the position of the electronic device 101 under the control of the processor 240. For example, the moving part 210 may include at least one of at least one wheel, a roller, a belt, or the like that may be driven by, for example, and without limitation, a motor, and may move on the bottom surface of the task space or through a rail installed on the bottom of the task space.

According to various embodiments, the task performing member 220 may include a component for performing a corresponding task in the task space under the control of the processor 240, and may include, for example, and without limitation, a robot arm. For example, the task performing member 220 may include a six-axis articulated robot arm.

According to various embodiments, the camera 230 may capture at least one of the first marker image or the second marker image attached to the task space. For example, the first marker image may include information related to the reference coordinate system, and the second marker image may include task area boundary information. For example, the task area boundary information may include at least one of coordinate information about at least one boundary surface, a slope, a shape of the task area boundary, or a minimum or maximum moving angle for each axis of the task performing member.

According to various embodiments, the processor 240 may include various processing circuitry (as used herein, including the claims, the term "processor" may include various processing circuitry, including at least one processor, wherein one or more processors of the at least one processor may be configured to perform the various functions described herein) and set the reference coordinate system of the task space based on the information related to the reference coordinate system.

According to various embodiments, one or more of the processor 240 may set a task area boundary in the reference coordinate system based on the task boundary information.

An operation of setting a task area boundary of the electronic device 101 according to various embodiments is described in greater detail below with reference to FIGS. 3 to 8.

FIG. 3 is a flowchart illustrating an example operation of setting a task area boundary by an electronic device according to various embodiments.

According to various embodiments, in operation 310, if a task command is received, the electronic device (e.g., the electronic device 101 of FIG. 1, the processor 120 of FIG. 1, the electronic device 101 of FIG. 2, or the processor 240 of FIG. 2) may move to a position related to task performing, identified based on the task performance command.

For example, when a task command is received from an external electronic device through a communication module (e.g., the communication module 190 of FIG. 1), the electronic device may move to the corresponding position. According to various embodiments, the electronic device may move to the corresponding position and dock at the corresponding position.

According to various embodiments, in operation 320, the electronic device may obtain a first marker image through a camera (e.g., the camera module 180 of FIG. 1 or the camera 230 of FIG. 2) after (e.g., based on) moving to the position. For example, the first marker image may include reference coordinate system information for setting a reference coordinate system. According to various embodiments, the first marker image may include a checker, a barcode, or a QR code.

According to various embodiments, in operation 330, the electronic device may configure (e.g., set) the reference coordinate system based on the first marker image.

For example, the electronic device may obtain reference coordinate system information from the first marker image and may set the reference coordinate system based on the obtained reference coordinate system information. For example, the electronic device may set a reference coordinate system including an x-axis, a y-axis, and a z-axis, with the marker position as the origin of the reference coordinate system.

According to various embodiments, when the electronic device fails to set the reference coordinate system, the electronic device may re-obtain the first marker image through the camera and re-set the reference coordinate system.

According to various embodiments, in operation 340, upon obtaining a second marker image through the camera, the electronic device may set a task area boundary in the reference coordinate system based on task area boundary information obtained through the second marker image. For example, the second marker image may include task area boundary information. According to various embodiments, the second marker image may include, for example, and without limitation, a checker, a barcode, a QR code, or the like.

According to various embodiments, the second marker image may be generated based on a user's drawing input related to the task area boundary, input to an external display device. The operation of generating the second marker image according to various embodiments is described in greater detail below with reference to FIGS. 9 and 10.

According to various embodiments, the second marker image may be disposed adjacent to the first marker image or may be disposed in the first marker image. The arrangement of the first marker image and the second marker image according to various embodiments is described in greater detail below with reference to FIGS. 5A, 5B and 5C.

FIG. 5A is a diagram illustrating an example first marker image and an example second marker image according to various embodiments.

According to various embodiments, referring to FIG. 5A, the first marker image may be a checker (e.g., checkered pattern, checkerboard, etc.), the second marker image may be a QR code, and the second marker image may be disposed adjacent to one side of the first marker image. Although FIG. 5A illustrates that the second marker image is disposed on the right side of the first marker image, the disclosure is not limited thereto, and the second marker image may be disposed on the left side, the upper side, or the lower side of the first marker image.

FIG. 5B is a diagram illustrating an example first marker image and an example second marker image according to various embodiments.

According to various embodiments, referring to FIG. 5B, the first marker image may be a checker (e.g., including a checkered pattern, checkerboard, etc.), the second marker image may be a barcode, and the second marker image may be disposed adjacent to one side of the first marker image. Although FIG. 5B illustrates that the second marker image is disposed on the upper side of the first marker image, the disclosure is not limited thereto, and the second marker image may be disposed on the left side, the right side, or the lower side of the first marker image.

FIG. 5C is a diagram illustrating an example first marker image and an example second marker image according to various embodiments.

According to various embodiments, referring to FIG. 5C, the first marker image may be a checker (e.g., including a checkered pattern, checkerboard, etc.), the second marker image may be a QR code, and the second marker image may be disposed in the first marker image.

According to various embodiments, the electronic device may receive task area boundary information from a beacon device through the communication module. For example, the electronic device may receive task area boundary information through at least one of the second marker image or the beacon device.

FIG. 5D is a diagram illustrating an example beacon device for task area boundary information and an example first marker image according to various embodiments.

According to various embodiments, referring to FIG. 5D, the first marker image may be a checker (e.g., including a checkered pattern, a checkerboard, etc.), and the beacon device may be disposed adjacent to the first marker image. According to various embodiments, the beacon device may be disposed at a position capable of transmitting and receiving information to and from the electronic device regardless of the position of the first marker image.

According to various embodiments, the electronic device may set the task area boundary in the reference coordinate system based on the task area boundary information received from the beacon device.

According to various embodiments, the task area boundary information may include at least one of coordinate information about at least one boundary surface, a slope, a shape of the task area boundary, or a minimum or maximum moving angle for each axis of the task performing member (e.g., the task performing member 220 of FIG. 2).

For example, the task area boundary information may include 6DOF (degrees of freedom) coordinate information such as (x, y, z, Ox, Oy, Oz). For example, x, y, and z may represent the position of the boundary surface with respect to the origin of the three-dimensional coordinate system, and Ox, Oy, and Oz may represent the angles at which the object is rotated counterclockwise about the respective axes (e.g., the x-axis, y-axis, and z-axis) as the slope of the boundary surface. An operation of setting a task area boundary based on task area boundary information according to various embodiments is described in greater detail below with reference to FIG. 4.

FIG. 4 is a diagram illustrating an example operation of setting a task area boundary surface by an electronic device according to various embodiments.

According to various embodiments, referring to FIG. 4, an electronic device 101 (e.g., the electronic device 101 of FIG. 1, the processor 120 of FIG. 1, the electronic device 101 of FIG. 2, or the processor 240 of FIG. 2) may obtain a first marker image 410 through a camera (e.g., the camera module 180 of FIG. 1 or the camera 230 of FIG. 2) and may set a reference coordinate system 411 based on reference coordinate system information included in the first marker image.

According to various embodiments, the electronic device may obtain a second marker image 420 through the camera after setting the reference coordinate system 411, and may set a task area boundary based on the task area boundary information included in the second marker image. For example, referring to FIG. 4, the electronic device 101 may set a boundary surface 421 based on one coordinate information included in the task area boundary information.

For example, when the coordinate information is (0, 5, 0, 0, 0, 80), the boundary surface may be rotated by 80 degrees about the z-axis from a position 5 degrees away from the origin of the reference coordinate system in the y-axis direction.

According to various embodiments, the shape of the task area boundary included in the task area boundary information may be obtained as the plurality of boundary surfaces cross each other. For example, the task area boundary information may include at least one of coordinate information or the slope of the plurality of boundary surfaces.

According to various embodiments, the electronic device may obtain information about at least one crossing line where the plurality of boundary surfaces cross each other based on at least one of the coordinate information or slope of the plurality of boundary surfaces and set a task area boundary based on the coordinate information, slope, and information about the cross line of the plurality of boundary surfaces. An operation of setting a task area boundary based on a plurality of boundary surfaces is described below with reference to FIG. 6.

FIG. 6 is a diagram illustrating a polygonal task area boundary of an electronic device according to various embodiments.

According to various embodiments, referring to FIG. 6, an electronic device (e.g., the electronic device 101 of FIG. 1, the processor 120 of FIG. 1, the electronic device 101 of FIG. 2, or the processor 240 of FIG. 2) may set a task area boundary 610 based on task area boundary information obtained from a second marker image in a reference coordinate system set based on a first marker image. According to various embodiments, the task area boundary information may be obtained from a beacon device.

For example, the second marker image may include three pieces of 6DOF coordinate information, and the task area boundary 610 may include three boundary surfaces 611, 612, and 613 corresponding to the three pieces of 6DOF coordinate information.

For example, the electronic device may set a first boundary surface 611 based on first coordinate information 0, P1, 0, 0, 0, θ1, set a second boundary surface 612 based on second coordinate information 0, P2, 0, 0, 0, θ2, and set a third boundary surface 613 based on third coordinate information P3, 0, 0, 0, 0, 90°-θ3.

According to various embodiments, the electronic device may obtain information about a first crossing line where the first boundary surface 611 and the second boundary surface 612 cross each other, and may obtain information about a second crossing line where the second boundary surface 612 and the third boundary surface 613 cross each other.

According to various embodiments, the electronic device may set a task boundary area 610 based on information about the first boundary surface 611 to the third boundary surface 613 and information about the first crossing line and the second crossing line in the reference coordinate system.

According to various embodiments, information about the shape of the task area boundary included in the task area boundary information may be included. For example, the task area boundary information may include information about two points and information that the shape of the task area boundary is a hexahedral shape having two points as vertices. An operation of setting a task area boundary when information about the shape of a task area boundary included in task area boundary information is included according to various embodiments is described in greater detail below with reference to FIG. 7.

FIG. 7 is a diagram illustrating a hexagonal task area boundary of an electronic device according to various embodiments.

According to various embodiments, referring to FIG. 7, an electronic device 101 (e.g., the electronic device 101 of FIG. 1, the processor 120 of FIG. 1, the electronic device 101 of FIG. 2, or the processor 240 of FIG. 2) may set a task area boundary 720 based on task area boundary information obtained from a second marker image in a reference coordinate system 710 set based on a first marker image. According to various embodiments, the task area boundary information may be obtained from a beacon device.

For example, the second marker image may include a plurality of coordinate information and information about the shape of the task area boundary. For example, the second marker image may include two pieces of coordinate information U and U' and information indicating that the task area boundary is a hexahedral.

According to various embodiments, based on the task area boundary information included in the second marker image, a hexahedral task area boundary 720 having the first coordinate U and the second coordinate U' as diagonal vertices may be set.

According to various embodiments, the task area boundary information may include a minimum or maximum moving angle for each axis of the task performing member (e.g., the task performing member 220 of FIG. 2) in the task area boundary. According to various embodiments, the electronic device (e.g., the electronic device 101 of FIG. 1, the processor 120 of FIG. 1, the electronic device 101 of FIG. 2, or the processor 240 of FIG. 2) may limit the moving angle range of each axis of the task performing member, based on the minimum or maximum moving angle for each axis of the task performing member included in the task area boundary information. An operation of limiting the moving angle range of each axis of the task performing member according to various embodiments is described with reference to FIG. 8.

FIG. 8 is a diagram illustrating an example movable area for each axis of an electronic device according to various embodiments.

According to various embodiments, referring to FIG. 8, the electronic device (e.g., the electronic device 101 of FIG. 1, the processor 120 of FIG. 1, the electronic device 101 of FIG. 2, or the processor 240 of FIG. 2) may limit the moving angle range of each axis (e.g., axis 1, axis 2, axis 3, axis 4, axis 5 and axis 6) of the task performing member of the electronic device in the reference coordinate system.

According to various embodiments, even if the task area boundary information does not include information about the minimum or maximum moving angle for each axis of the task performing member, the electronic device may set the moving angle range for each axis of the task performing member of the electronic device based on the task area boundary set in the reference coordinate system and the position of the electronic device.

According to various embodiments, the moving angle range for each axis of the task performing member may be set to an absolute value range of the moving angle for each axis, or may be set in the form of an equation in which the moving angle range of the corresponding axis is changed according to the angle of another axis.

According to various embodiments, if setting the task area boundary in the reference coordinate system fails, the electronic device (e.g., the electronic device 101 of FIG. 1, the processor 120 of FIG. 1, the electronic device 101 of FIG. 2, or the processor 240 of FIG. 2) may reobtain the second marker image through a camera (e.g., the camera module 180 of FIG. 1 or the camera 230 of FIG. 2). According to various embodiments, the electronic device may re-receive task area boundary information from a beacon device through a communication module (e.g., the communication module 190 of FIG. 1).

Referring back to FIG. 3, according to various embodiments, in operation 350, the electronic device may control at least one task performing member (e.g., the task performing member 220 of FIG. 2) to operate within a task boundary.

According to various embodiments, the electronic device may transmit, to an external display device through the communication module, an image in which the task area boundary is displayed in augmented reality in the image obtained through the camera. For example, the electronic device may obtain an image (e.g., a still image or a video) captured for the task space through the camera, and may transmit an image in which the set task area boundary is displayed in augmented reality to the external display device. Accordingly, it is possible to intuitively display the task area boundary in the task space of the electronic device through the external display device and provide the same to the user.

FIG. 9 is a diagram illustrating an example operation of displaying a task area boundary in augmented reality according to various embodiments.

According to various embodiments, referring to FIG. 9, a display device 900 (e.g., the electronic device of FIG. 1) may display an image captured for a task space including a first marker image 910 for setting a reference coordinate system.

According to various embodiments, the electronic device 101 (e.g., the electronic device 101 of FIG. 1 or the electronic device 101 of FIG. 2) may be disposed in the task space, and in a state in which the electronic device 101 is not disposed, an object corresponding to the electronic device 101 may be input to the image captured for the task space by a user input.

According to various embodiments, the display device 900 may receive the task area boundary 920 of the electronic device 101 by, for example, a user input. For example, the display device 900 may receive the user's drawing input of drawing a task area boundary 920 through a touchscreen (e.g., the display module 160 of FIG. 1). In an embodiment, the display device 900 may receive the user's drawing input, input through an external input device (e.g., a mouse or a drawing pad), from the external input device.

According to various embodiments, the display device 900 may generate a marker image including task area boundary 920 information received by a user input. An operation of generating a marker image including task area boundary information using augmented reality is described in greater detail below with reference to FIG. 10.

FIG. 10 is a flowchart illustrating an example operation of generating a marker image including task area boundary information using augmented reality according to various embodiments.

According to various embodiments, in operation 1001, a display device (e.g., the electronic device 101 of FIG. 1 or the display device 900 of FIG. 9) may execute an AR camera application.

According to various embodiments, in operation 1002, the display device may capture a task place and a marker. For example, the display device may capture the task place and the marker for setting the reference coordinate system using the camera (e.g., the camera module 180 of FIG. 1).

According to various embodiments, in operation 1003, the display device may install a task boundary (e.g., an AR object) by anchoring the marker. For example, the display device may fix the position of the marker in the image, dispose a mobile robot (e.g., the electronic device 101 of FIG. 1 or the electronic device 101 of FIG. 2) as an augmented reality (AR) object in the image, and dispose a task area boundary as an AR object. For example, one of a plurality of area boundary objects stored in an application may be selected and disposed, as the AR object of a task area boundary, or may be disposed through the user's drawing input.

According to various embodiments, in operation 1004, the display device may determine whether the task area boundary installation is successful. For example, it may be determined whether the installation of at least one of the augmented reality object of the mobile robot or the augmented reality object of the task area boundary in the image is successful. For example, when the augmented reality object of the mobile robot is installed in the air or the augmented reality object of the task area boundary is installed in a place irrelevant to the task area of the mobile robot, the display device may determine that the task area boundary installation fails.

According to various embodiments, when it is determined that the installation of the task area boundary fails (no in operation 1004), the display device may return to operation 1003 to reinstall the task area boundary.

According to various embodiments, when it is determined that the installation of the task area boundary is successful (yes in operation 1004), in operation 1005, the display device may calculate the coordinates of the task boundary having the coordinates in the marker as the origin. For example, the display device may set the reference coordinate system by setting the marker for setting the reference coordinate system as the origin of the reference coordinate system, and calculate the coordinates of the task area boundary.

According to various embodiments, in operation 1006, the display device may check the validity of the calculated coordinates of the task area boundary. For example, the display device may determine whether the coordinates of the task area boundary are valid in relation to the possibility of actual utilization in consideration of the design of the actual task space and the position or size of the machine or article disposed in the actual task space.

According to various embodiments, when it is determined that the task area boundary is not valid (no in operation 1006), the display device may return to operation 1003 to reinstall the task area boundary.

According to various embodiments, when it is determined that the task area boundary is valid (yes in operation 1006), the display device may generate a QR code including the task area boundary information in operation 1007. According to various embodiments, the display device may generate a barcode or checker including task area boundary information, or may transmit the task area boundary information to the beacon device.

According to various embodiments, in operation 1008, the display device may print the QR code. According to various embodiments, the printed QR code may be attached within the task area. For example, the printed QR code may be attached adjacent to or within the marker image for setting the reference coordinate system, as shown in FIGS. 5A to 5C.

According to various example embodiments, an electronic device (e.g., the electronic device of FIG. 1 or the electronic device 101 of FIG. 2) may comprise: a moving member including a motor (e.g., the moving member 210 of FIG. 2), a task performing member comprising an arm (e.g., the task performing member 220 of FIG. 2), a communication module comprising communication circuitry (e.g., the communication module 190 of FIG. 1), a camera (e.g., the camera module 180 of FIG. 1 or the camera 230 of FIG. 20), and at least one processor (e.g., the processor 120 of FIG. 1 or the processor 240 of FIG. 2) operatively connected to the moving member, the task performing member, the communication module, and the camera. One or more of the at least one processor may be configured to: upon receiving a task performance command through the communication module, control the moving member to move to a task performing-related position identified based on the task performance command, obtain a first marker image through the camera based on moving to the position, set a reference coordinate system based on the first marker image, upon obtaining a second marker image through the camera, set a task area boundary in the reference coordinate system based on task area boundary information obtained through the second marker image, and control at least one task performing member to operate within the task area boundary.

According to various example embodiments, the task area boundary information may include at least one of coordinate information about at least one boundary surface, a slope, a shape of the task area boundary, or a minimum or maximum moving angle for each axis of the task performing member.

According to various example embodiments, the task area boundary information may include at least one of coordinate information about a plurality of boundary surfaces or a slope. One or more of the at least one processor may be configured to: obtain information about at least one crossing line where the plurality of boundary surfaces cross each other based on at least one of the coordinate information about the plurality of boundary surfaces or the slope and set the task area boundary based on the coordinate information about the plurality of boundary surfaces, the slope, and the information about the crossing line.

According to various example embodiments, one or more of the at least one processor may be configured to, based on setting the reference coordinate system failing, reobtain the first marker image through the camera.

According to various example embodiments, one or more of the at least one processor may be configured to, based on setting the task area boundary failing, reobtain the second marker image through the camera.

According to various example embodiments, one or more of the at least one processor may be configured to transmit an image obtained by displaying, in augmented reality, the task area boundary in an image obtained through the camera, to an external display device through the communication module.

According to various example embodiments, one or more of the at least one processor may be configured to: receive task area boundary information from a beacon device through the communication module, and set the task area boundary in the reference coordinate system based on the received task area boundary information.

According to various example embodiments, the second marker image may be generated based on a drawing input related to the task area boundary, input to an external display device.

According to various example embodiments, the second marker image may include a QR code image or a barcode image.

According to various example embodiments, a method for controlling an electronic device may comprise: upon receiving a task performance command, moving to a task performing-related position identified based on the task performance command, obtaining a first marker image through a camera based on moving to the position, setting a reference coordinate system based on the first marker image, upon obtaining a second marker image through the camera, setting a task area boundary in the reference coordinate system based on task area boundary information obtained through the second marker image, and controlling a task performing member to operate within the task area boundary.

According to various example embodiments, the task area boundary information may include at least one of coordinate information about at least one boundary surface, a slope, a shape of the task area boundary, or a minimum or maximum moving angle for each axis of the task performing member.

According to various example embodiments, the task area boundary information may include at least one of coordinate information about a plurality of boundary surfaces or a slope. Setting the task area boundary may include obtaining information about at least one crossing line where the plurality of boundary surfaces cross each other based on at least one of the coordinate information about the plurality of boundary surfaces or the slope and setting the task area boundary based on the coordinate information about the plurality of boundary surfaces, the slope, and the information about the crossing line.

According to various example embodiments, the method may further comprise, based on setting the reference coordinate system failing, reobtaining the first marker image through the camera.

According to various example embodiments, the method may further comprise, based on setting the task area boundary failing, reobtaining the second marker image through the camera.

According to various example embodiments, the method may further comprise transmitting an image obtained by displaying, in augmented reality, the task area boundary in an image obtained through the camera, to an external display device.

According to various example embodiments, the method may further comprise receiving task area boundary information from a beacon device and setting the task area boundary in the reference coordinate system based on the received task area boundary information.

According to various example embodiments, the second marker image may be generated based on a drawing input related to the task area boundary, input to an external display device.

According to various example embodiments, the second marker image may include a QR code image or a barcode image.

According to various example embodiments, a display device (e.g., the electronic device 101 of FIG. 1 or the display device 900 of FIG. 9) may comprise: a camera (e.g., the camera module 180 of FIG. 1), a display (e.g., the display module 160 of FIG. 1), and at least one processor (e.g., the processor 120 of FIG. 1) operatively connected to the camera and the display. One or more of the at least one processor may display, on the display, an image for a task space including a first marker image through the camera, receive a drawing input related to a task area boundary in the task space displayed on the display, display, in augmented reality, the drawing input in the task space displayed on the display, generate task area boundary information based on the user's drawing input on a reference coordinate system set based on the first marker image, and generate a second marker image including the task area boundary information.

According to various example embodiments, the task area boundary information may include at least one of coordinate information about at least one boundary surface, a slope, a shape of the task area boundary, or a minimum or maximum moving angle for each axis of the task performing member.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The storage medium readable by the machine may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
a moving member comprising a motor;
a task performing member comprising an arm;
a communication module comprising communication circuitry;
a camera; and
at least one processor operatively connected to the moving member, the task performing member, the communication module, and the camera,
wherein one or more of the at least one processor is configured to:
based on receiving a task performance command through the communication module, control the moving member to move the electronic device to a position related to a task performing identified based on the task performance command;
obtain a first marker image through the camera based on moving to the position;
set a reference coordinate system based on the first marker image;
based on obtaining a second marker image through the camera, set a task area boundary in the reference coordinate system based on task area boundary information obtained through the second marker image; and
control at least one task performing member to operate within the task area boundary.

2. The electronic device of claim 1, wherein the task area boundary information includes at least one of coordinate information and a slope of at least one boundary surface, a shape of the task area boundary, or a minimum or maximum moving angle for each axis of the task performing member.

3. The electronic device of claim 1, wherein the task area boundary information includes at least one of coordinate information or slopes of a plurality of boundary surfaces, and
wherein one or more of the at least one processor is configured to:
obtain information about at least one crossing line where the plurality of boundary surfaces cross each other based on at least one of the coordinate information or the slopes of the plurality of boundary surfaces; and
set the task area boundary based on the coordinate information and the slopes of the plurality of boundary surfaces, and the information about the crossing line.

4. The electronic device of claim 1, wherein one or more of the at least one processor is configured to, based on setting the reference coordinate system failing, reobtain the first marker image through the camera.

5. The electronic device of claim 1, wherein one or more of the at least one processor is configured to, based on setting the task area boundary failing, reobtain the second marker image through the camera.

6. The electronic device of claim 1, wherein one or more of the at least one processor is configured to transmit an image in which the task area boundary is displayed in augmented reality on an image obtained through the camera, to an external display device through the communication module.

7. The electronic device of claim 1, wherein one or more of the at least one processor is configured to:
receive task area boundary information from a beacon device through the communication module; and
set the task area boundary in the reference coordinate system based on the received task area boundary information.

8. The electronic device of claim 1, wherein the second marker image is generated based on a drawing input related to the task area boundary, input to an external display device.

9. The electronic device of claim 1, wherein the second marker image includes a QR code image or a barcode image.

10. A method for controlling an electronic device, the method comprising:
based on receiving a task performance command, moving the electronic device to a position related to a task performing identified based on the task performance command;
obtaining a first marker image through a camera based on moving to the position;
setting a reference coordinate system based on the first marker image;
based on obtaining a second marker image through the camera, setting a task area boundary in the reference coordinate system based on task area boundary information obtained through the second marker image; and
controlling a task performing member comprising an arm to operate within the task area boundary.

11. The method of claim 10, wherein the task area boundary information includes at least one of coordinate information and a slope of at least one boundary surface, a shape of the task area boundary, or a minimum or maximum moving angle for each axis of the task performing member.

12. The method of claim 10, wherein the task area boundary information includes at least one of coordinate information or slopes of a plurality of boundary surfaces, and wherein setting the task area boundary includes:
obtaining information about at least one crossing line where the plurality of boundary surfaces cross each other based on at least one of the coordinate information or the slopes about the plurality of boundary surfaces; and
setting the task area boundary based on the coordinate information and the slopes of the plurality of boundary surfaces, and the information about the crossing line.

13. The method of claim 10, further comprising, based on setting the reference coordinate system failing, reobtaining the first marker image through the camera.

14. The method of claim 10, further comprising, based on setting the task area boundary failing, reobtaining the second marker image through the camera.

15. The method of claim 10, further comprising transmitting an image in which the task area boundary is displayed in augmented reality on an image obtained through the camera, to an external display device.

16. The method of claim 10, further comprising:
receiving task area boundary information from a beacon device through the communication module; and
setting the task area boundary in the reference coordinate system based on the received task area boundary information.

17. The method of claim 10, wherein the second marker image is generated based on a drawing input related to the task area boundary, input to an external display device.

18. The method of claim 10, wherein the second marker image includes a QR code image or a barcode image.

19. A display device, comprising:
a camera;
a display; and
at least one processor operatively connected to the camera and the display,
wherein one or more of the at least one processor is configured to:
display, on the display, an image, obtained by the camera, of a task space including a first marker image,
receive a drawing input related to a task area boundary in the task space displayed on the display,
display the drawing input in augmented reality in the task space displayed on the display,
generate task area boundary information based on the drawing input in a reference coordinate system set based on the first marker image, and
generate a second marker image including the task area boundary information.

20. The display device of claim 19, wherein the task area boundary information includes at least one of coordinate information and a slope of at least one boundary surface, a shape of the task area boundary, or a minimum or maximum moving angle for each axis of the task performing member.

* * * * *